United States Patent
Kobayashi

(10) Patent No.: US 8,212,936 B2
(45) Date of Patent: Jul. 3, 2012

(54) PICTURE QUALITY CONTROL APPARATUS, METHOD THEREFOR, PICTURE QUALITY PROCESSING APPARATUS, PROGRAMS FOR THEM, AND RECORDING MEDIUM RECORDING THAT PROGRAM THEREIN

(75) Inventor: Nao Kobayashi, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 1307 days.

(21) Appl. No.: 11/628,781

(22) PCT Filed: Jun. 7, 2005

(86) PCT No.: PCT/JP2005/010398
§ 371 (c)(1),
(2), (4) Date: Sep. 11, 2007

(87) PCT Pub. No.: WO2005/122558
PCT Pub. Date: Dec. 22, 2005

(65) Prior Publication Data
US 2011/0102680 A1  May 5, 2011

(30) Foreign Application Priority Data

Jun. 10, 2004 (JP) ................................ 2004-172583

(51) Int. Cl.
*H04N 5/21* (2006.01)
(52) U.S. Cl. ........ 348/625; 348/678; 348/687; 348/251; 348/254; 382/274; 345/589
(58) Field of Classification Search .................. 348/625, 348/678, 687, 251, 254; 382/274; 345/589
See application file for complete search history.

(56) References Cited

U.S. PATENT DOCUMENTS 5,146,331 A * 9/1992 Tsuchida .................. 348/556
(Continued)

FOREIGN PATENT DOCUMENTS
JP          3-126381          5/1991
(Continued)

OTHER PUBLICATIONS

Office Action dated Jan. 26, 2010 issued for the corresponding Japanese patent application No. 2006-514507 with English translation.

*Primary Examiner* — Jefferey Harold
*Assistant Examiner* — Mustafizur Rahman
(74) *Attorney, Agent, or Firm* — Kratz, Quintos & Hanson, LLP

(57) ABSTRACT

A request recognition section (373) recognizes an input operation for a source switching request to switch broadcast program contents extracted from broadcast waves to contents recorded in a recording and reproducing apparatus to display the contents on a display unit (350). Values of a plurality of setting factors such as brightness, contrast, and black level related to picture quality, which correspond to the source to be switched, specified corresponding to the previous contents source are read from a memory (360). Predefined values of the setting factors set corresponding to the previous contents source are compared with values newly read, and the values of the respective setting factors are sequentially changed stepwise. It is possible to prevent a flicker on a screen caused by a sudden change in the picture quality during processing of changing the picture quality, thereby favorably adjusting the picture quality.

12 Claims, 4 Drawing Sheets

U.S. PATENT DOCUMENTS

| | | | | |
|---|---|---|---|---|
| 5,479,215 A | * | 12/1995 | Chmielewski et al. | 348/627 |
| 7,667,781 B2 | * | 2/2010 | Yamamoto et al. | 348/734 |
| 2001/0043784 A1 | * | 11/2001 | Shirata et al. | 386/21 |
| 2005/0062993 A1 | * | 3/2005 | Hayaishi | 358/1.9 |

FOREIGN PATENT DOCUMENTS

| | | |
|---|---|---|
| JP | 4-040171 | 2/1992 |
| JP | 4-77102 | 3/1992 |
| JP | 4-160875 | 6/1992 |
| JP | 5-236387 | 9/1993 |
| JP | 6-253180 | 9/1994 |
| JP | 8-2986627 | 11/1996 |
| JP | 9-307913 | 11/1997 |
| JP | 11-55598 | 2/1999 |
| JP | 11-298824 | 10/1999 |
| JP | 2000-78496 | 3/2000 |
| JP | 2001-45402 | 2/2001 |
| JP | 2001-282220 | 10/2001 |
| JP | 2002-158893 | 3/2002 |
| JP | 2002-158941 | 5/2002 |
| JP | 2002-372943 | 12/2002 |
| JP | 2003-298974 | 10/2003 |
| JP | 2003-338948 | 11/2003 |
| JP | 2004-45466 | 2/2004 |

* cited by examiner

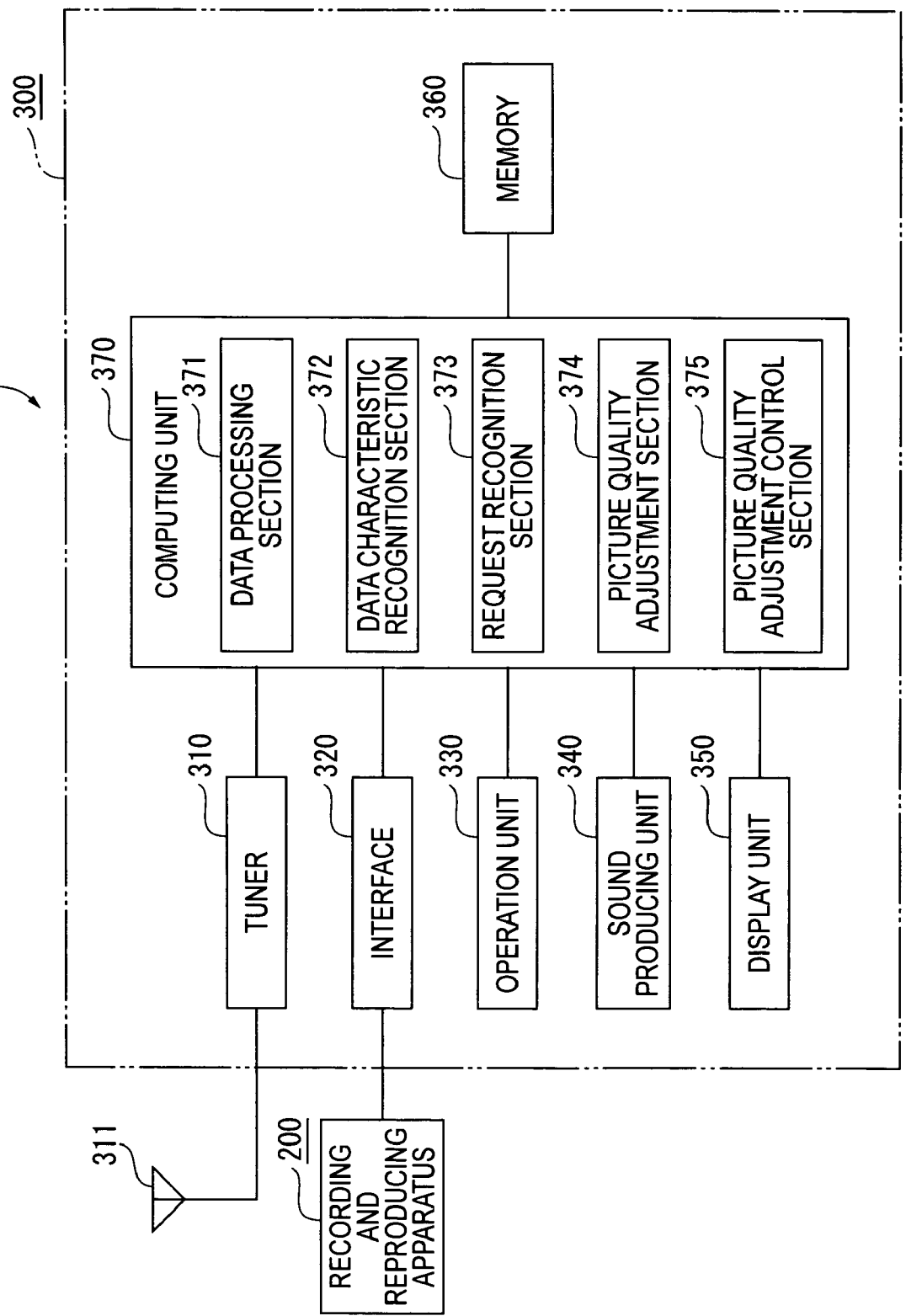

FIG. 2

TV PICTURE QUALITY : ( BRIGHTNESS 5,  CONTRAST 0,  BLACK LEVEL 0 )
↓ ADJUST CONTRAST (+2)
( BRIGHTNESS 5,  CONTRAST 2,  BLACK LEVEL 0 )
↓ ADJUST BLACK LEVEL (+2)
( BRIGHTNESS 5,  CONTRAST 2,  BLACK LEVEL 2 )
↓ ADJUST BRIGHTNESS (-2)
( BRIGHTNESS 3,  CONTRAST 2,  BLACK LEVEL 2 )
↓ ADJUST CONTRAST (+2)
( BRIGHTNESS 3,  CONTRAST 4,  BLACK LEVEL 2 )
↓ ADJUST BLACK LEVEL (+2)
( BRIGHTNESS 3,  CONTRAST 4,  BLACK LEVEL 4 )
↓ ADJUST BRIGHTNESS (-2)
( BRIGHTNESS 1,  CONTRAST 4,  BLACK LEVEL 4 )
↓ ADJUST CONTRAST (+1 BECAUSE OF MAXIMUM VALUE)
( BRIGHTNESS 1,  CONTRAST 5,  BLACK LEVEL 4 )
↓ ADJUST BLACK LEVEL (+1 BECAUSE OF MAXIMUM VALUE)
( BRIGHTNESS 1,  CONTRAST 5,  BLACK LEVEL 5 )
↓ ADJUST BRIGHTNESS (-2)
( BRIGHTNESS -1,  CONTRAST 5,  BLACK LEVEL 5 )
↓ NO ADJUSTMENT FOR CONTRAST
( BRIGHTNESS -1,  CONTRAST 5,  BLACK LEVEL 5 )
↓ NO ADJUSTMENT FOR BLACK LEVEL
( BRIGHTNESS -1,  CONTRAST 5,  BLACK LEVEL 5 )
↓ ADJUST BRIGHTNESS (-2)
( BRIGHTNESS -3,  CONTRAST 5,  BLACK LEVEL 5 )
↓ NO ADJUSTMENT FOR CONTRAST
( BRIGHTNESS -3,  CONTRAST 5,  BLACK LEVEL 5 )
↓ NO ADJUSTMENT FOR BLACK LEVEL
( BRIGHTNESS -3,  CONTRAST 5,  BLACK LEVEL 5 )
↓ ADJUST BRIGHTNESS (-2)
DVD PICTURE QUALITY : ( BRIGHTNESS -5,  CONTRAST 5,  BLACK LEVEL 5 )

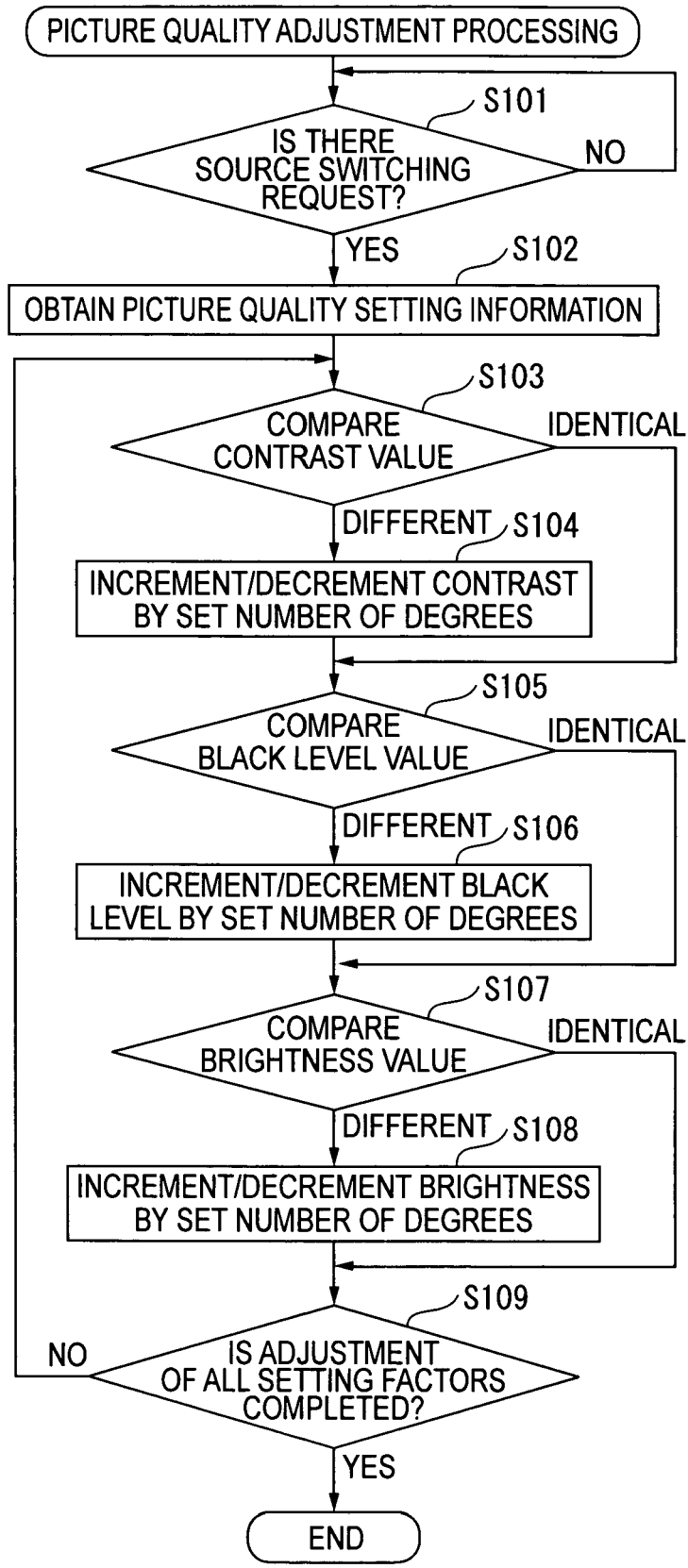

FIG. 4

TV PICTURE QUALITY : ( BRIGHTNESS 5,  CONTRAST 0,  BLACK LEVEL 0 )
↓ ADJUST CONTRAST (+1)
( BRIGHTNESS 5,  CONTRAST 1,  BLACK LEVEL 0 )
↓ ADJUST BLACK LEVEL (+1)
( BRIGHTNESS 5,  CONTRAST 1,  BLACK LEVEL 1 )
↓ ADJUST BRIGHTNESS (-2)
( BRIGHTNESS 3,  CONTRAST 1,  BLACK LEVEL 1 )
↓ ADJUST CONTRAST (+1)
( BRIGHTNESS 3,  CONTRAST 2,  BLACK LEVEL 1 )
↓ ADJUST BLACK LEVEL (+1)
( BRIGHTNESS 3,  CONTRAST 2,  BLACK LEVEL 2 )
↓ ADJUST BRIGHTNESS (-2)
( BRIGHTNESS 1,  CONTRAST 2,  BLACK LEVEL 2 )
↓ ADJUST CONTRAST (+1)
( BRIGHTNESS 1,  CONTRAST 3,  BLACK LEVEL 2 )
↓ ADJUST BLACK LEVEL (+1)
( BRIGHTNESS 1,  CONTRAST 3,  BLACK LEVEL 3 )
↓ ADJUST BRIGHTNESS (-2)
( BRIGHTNESS-1,  CONTRAST 3,  BLACK LEVEL 3 )
↓ ADJUST CONTRAST (+1)
( BRIGHTNESS-1,  CONTRAST 4,  BLACK LEVEL 3 )
↓ ADJUST BLACK LEVEL (+1)
( BRIGHTNESS-1,  CONTRAST 4,  BLACK LEVEL 4 )
↓ ADJUST BRIGHTNESS (-2)
( BRIGHTNESS-3,  CONTRAST 4,  BLACK LEVEL 4 )
↓ ADJUST CONTRAST (+1)
( BRIGHTNESS-3,  CONTRAST 5,  BLACK LEVEL 4 )
↓ ADJUST BLACK LEVEL (+1)
( BRIGHTNESS-3,  CONTRAST 5,  BLACK LEVEL 5 )
↓ ADJUST BRIGHTNESS (-2)
DVD PICTURE QUALITY : ( BRIGHTNESS-5,  CONTRAST 5,  BLACK LEVEL 5 )

PICTURE QUALITY CONTROL APPARATUS, METHOD THEREFOR, PICTURE QUALITY PROCESSING APPARATUS, PROGRAMS FOR THEM, AND RECORDING MEDIUM RECORDING THAT PROGRAM THEREIN

TECHNICAL FIELD

The present invention relates to a picture quality control apparatus for controlling picture quality of picture data to be displayed on a screen of a display unit, a method therefore, a picture quality processing apparatus, programs fore them, and a recording medium recording that program therein.

BACKGROUND ART

In conventional techniques, a configuration is employed in which, when picture data is displayed on a screen of a television receiver, for example, picture quality settings such as contrast and brightness are appropriately changed based on a state of screen display for the picture data displayed on the screen to be preferably viewed. A known example of the configuration for changing the picture quality settings is a control technique of appropriately changing settings automatically according to picture data (for example, see Patent Document 1 or Patent Document 2).

In a technique described in Patent Document 1, a scene having a dark picture is detected. In the detection, a video signal is amplified at high gain and clamped at black level, and then, is held outside a video region while integrated at the video region. Based on a result of the detection, the picture quality determined by brightness, contrast, color intensity, and the like is controlled such that, in the scene having a dark picture, the brightness is increased while the contrast is decreased to keep the maximum amplitude of the video signal constant or the color intensity is decreased.

In a technique described in Patent Document 2, the picture quality, which is determined by brightness, contrast, color intensity, sharpness, and the like set by a viewer, is stored in a recording unit of a control circuit for each type of programs. When a program of an identical type is viewed, the type of the program is detected from program information in the received signal, such as EPG data. A picture quality setting condition of the detected type of the program is read from the recording unit and the received signal is processed to have the set picture quality.

[Patent Document 1] JP 2000-78496 A (left column of page 4 to left column of page 5)

[Patent Document 2] JP 2002-158941 A (right column of page 3 to right column of page 6)

DISCLOSURE OF THE INVENTION

Problems to be Solved by the Invention

However, in the conventional techniques of changing the picture quality settings as described in Patent Documents 1 and 2, the picture on the screen may become brighter for a moment during the picture quality changing processing. To be specific, even when a dark scene is changed to a dark scene, the picture on the screen may become brighter for a moment while the picture quality settings are changed. For example, with respect to three setting factors, i.e., brightness, contrast, and black level related to the picture quality, in a case where the brightness is adjusted in a range of "±5" and the contrast and the black level are each adjusted in a range of "0 to 5", a process example of changing the picture quality settings is described in which a dark screen picture having a brightness of "5", a contrast of "0", and a black level of "0" is changed to a dark screen picture having a brightness of "−5", a contrast of "5", and a black level of "5". First, the value of the contrast is changed to "5" in a first step, the value of the black level is changed to "5" in a second step, and the value of the brightness is changed to "−5" in a third step. After the process of the first step and during the process of the second step, the screen picture has a very bright picture quality. Accordingly, when the picture quality is just changed, there is a problem in that a bright screen picture or a dark screen picture is inserted like a noise for a moment during the process of changing the picture quality settings when the picture is changed, for example.

In view of the above-mentioned problem, an object of the present invention is to provide a picture quality control apparatus for preferably changing settings of picture quality, a method therefore, a picture quality processing apparatus, programs for them, and a recording medium recording that program therein.

Means for Solving the Problems

The present invention provides a picture quality control apparatus for controlling processing in which a picture quality adjustment section changes values of a plurality of setting factors related to picture quality in a display unit for displaying picture data on a screen to adjust the picture quality, the picture quality control apparatus including: a request recognition section for recognizing picture quality adjustment request information which requests the picture quality adjustment section to change the values of the plurality of setting factors; and a picture quality adjustment control section for controlling the picture quality adjustment section to execute, during processing of changing a value of at least one of the plurality of setting factors, processing of changing a value of at least another one of the plurality of setting factors, based on a recognition of the picture quality adjustment request information.

The present invention provides a picture quality control apparatus for controlling processing in which a picture quality adjustment section changes values of a plurality of setting factors related to picture quality in a display unit which displays picture data on a screen to adjust the picture quality, the picture quality control apparatus including: a data characteristic recognition section for recognizing characteristic of the picture data displayed on the screen of the display unit; and a picture quality adjustment control section for controlling the picture quality adjustment section to execute, during processing of changing a value of at least one of the plurality of setting factors, processing of changing a value of at least another one of the plurality of setting factors when changing of the characteristic of the picture data is recognized.

A picture quality processing apparatus of the present invention includes: the above-mentioned picture quality control apparatus of the present invention; and a picture quality adjustment section which is controlled by the picture quality control apparatus, for executing processing of adjusting picture quality in a display unit.

The present invention provides a picture quality control method of causing a computing unit to control processing of adjusting picture quality by changing values of a plurality of setting factors related to the picture quality in a display unit for displaying picture data on a screen by a picture quality adjustment section, the picture quality control method including: recognizing, by the computing unit, picture quality adjustment request information which requests the picture quality adjustment section to change the values of the plurality of setting factors; and controlling, by the computing unit, the picture quality adjustment section to execute, during processing of changing a value of at least one of the plurality of setting factors, processing of changing a value of at least another one of the plurality of setting factors, based on the recognized picture quality adjustment request information.

The present invention provides a picture quality control method of causing a computing unit to control processing of adjusting picture quality by changing values of a plurality of setting factors related to the picture quality in a display unit for displaying picture data on a screen by a picture quality adjustment section, the picture quality control method including: recognizing, by the computing unit, characteristic of the picture data to be displayed on the screen of the display unit; recognizing, by the computing unit, changing of the recognized characteristic of the picture data; and controlling, by the computing unit, when the changing of the characteristic of the picture data is recognized, the picture quality adjustment section to execute, during processing of changing a value of at least one of the plurality of setting factors, processing of changing a value of at least another one of the plurality of setting factors.

The present invention provides a program for controlling picture quality adjustment processing, which causes a computing unit to function as the above-mentioned picture quality control apparatus or as the above-mentioned picture quality processing apparatus of the present invention.

The present invention provides a program for controlling picture quality adjustment processing, which causes a computing unit to execute the above-mentioned picture quality control method of the present invention.

The present invention provides a recording medium recorded with a program for controlling picture quality adjustment processing, in which the program for controlling picture quality adjustment processing according to the present invention is recorded in a manner readable by a computing unit.

BRIEF DESCRIPTION OF DRAWINGS

FIG. 1 is a block diagram showing a schematic configuration of a display system that includes a picture quality processing apparatus according to an embodiment of the present invention.

FIG. 2 is an explanatory diagram schematically showing processing of changing stepwise values of setting factors related to picture quality performed by a picture quality adjustment control section according to this embodiment.

FIG. 3 is a flowchart showing an operation of picture quality adjustment processing according to this embodiment.

FIG. 4 is an explanatory diagram schematically showing processing of changing stepwise values of setting factors in the picture quality processing apparatus according to another embodiment of the present invention.

EXPLANATION OF CODES 350 display unit
370 computing unit which functions as picture quality processing apparatus equipped with picture quality control apparatus
  372 data characteristic recognition section
  373 request recognition section
  374 picture quality adjustment section
  375 picture quality adjustment control section

BEST MODE FOR CARRYING OUT THE INVENTION

Hereinafter, an embodiment of the present invention is described based on the accompanying drawings. In this embodiment, a display system provided with a picture quality processing apparatus that includes a picture quality control apparatus of the present invention is shown and described as an example. However, the present invention is not limited thereto and can be applied to a recording and reproducing apparatus for recording and reproducing picture data, and an integrated display apparatus having a configuration for performing only recording or reproduction, or a configuration for performing recording and reproduction, for example. The display apparatus is not limited to televisions having a Braun tube or a cathode-ray tube (CRT). Any configuration capable of displaying picture data on a screen, such as projectors and televisions of various kinds of display units, for example, a liquid crystal display unit and a plasma display panel (PDP), can be used as the display apparatus.

(Configuration of the Display System)

In FIG. 1, reference numeral 100 denotes the display system. The display system 100 is capable of reproducing contents obtained from outside through screen display and audio output, and recording the contents. Examples of the contents include TV broadcast programs and satellite broadcast programs obtained from broadcast waves; contents of sound and pictures such as video or still pictures outputted from an external apparatus connected so as to be able to transmit and receive various kinds of data; contents of music and video obtained through networks (not shown) such as the Internet and intranets; and contents of pictures and sound related to various software programs such as game software. The display system 100 includes a recording and reproducing apparatus 200 serving as an external apparatus and a display apparatus 300.

The recording and reproducing apparatus 200 is connected to the display apparatus 300 so as to be able to transmit and receive various kinds of data. The recording and reproducing apparatus 200 obtains and records contents and outputs the contents to be recorded to the display apparatus 300 and reproduces the contents on the display apparatus 300. In other words, the recording and reproducing apparatus 200 is configured to be able to receive broadcast waves and obtain contents through networks, and is provided with a recording unit (not shown) for recording contents in a manner in which the contents can be read. Examples of the recording unit include a configuration having a drive or a driver for storing various kinds of information in a manner in which the information can be read, in various recording media that include fixed memories and detachable media, such as hard disk drives (HDDs), optical disks including compact discs (CDs) and digital versatile discs (DVDs), magneto-optical discs, and memory cards; and a configuration having a combination thereof.

The display apparatus 300 reproduces contents obtained from broadcast waves, a network, or the recording and reproducing apparatus. The display apparatus 300 includes a tuner 310, an interface 320, an operation unit 330, a sound producing unit 340, a display unit 350, a memory 360, and a computing unit 370.

The tuner 310 is connected to the computing unit 370 and to an antenna 311. The tuner 310 receives, through the antenna 311, various broadcast waves, e.g., those for analog terrestrial broadcasting, digital terrestrial broadcasting, and digital satellite broadcasting. The tuner 310 obtains a signal having a predetermined band frequency corresponding to a predetermined channel based on a signal outputted by the operation unit 330, appropriately processes the obtained signal, and outputs the processed signal to the computing unit.

The interface 320 is connected to the computing unit 370 and is also connected to the recording and reproducing apparatus 200 and the like such that various kinds of data can be transmitted and received. The interface 320 can also be connected to a network. The interface 320 obtains various kinds of data from the recording and reproducing apparatus 200 or a network, appropriately processes the obtained data, and outputs the processed data to the computing unit 370. Further, the interface 320 appropriately processes data obtained from the computing unit 370 and outputs the processed data to the recording and reproducing apparatus 200 or the network.

The operation unit 330 includes, for example, various operation buttons and operation dials (not shown) arranged in front of the display apparatus 300 so as to be manipulated for an input operation. The operation unit 330 is connected to the computing unit 370, and outputs a signal corresponding to an input operation performed with the operation buttons and the operation dials to the computing unit 370 to cause the computing unit 370 to set the content of the input operation. Examples of the content of the input operation include various setting items of operations of the display apparatus 300, such as setting a broadcast program channel, setting the volume and sound quality, setting the picture quality for screen display, and setting source switching to a source of content to be reproduced. Examples of a configuration which can be used for the operation unit 330 include a configuration having a remote-control light receiving section for receiving various signals transmitted from a remote controller (not shown) through an infrared ray to output the various signals to the computing unit 370 as operation signals; and any configuration capable of inputting and setting the various setting items through input operations by using a touch panel provided on the display unit 350, input operations using voice, and the like, in addition to the input operations performed with the operation buttons and the operation dials.

The sound producing unit 340 includes, for example, a speaker and an amplifier (not shown). The sound producing unit 340 is controlled by the computing unit 370 and outputs as sound various signals of audio data and the like transmitted from the computing unit 370 from the speaker. Examples of the audio data to be outputted as sound include audio data of operation sound, confirmation sound, and beep sound which correspond to input operations performed through the operation unit 330, in addition to audio data of contents.

The display unit 350 is controlled by the computing unit 370 and displays picture data transmitted from the computing unit 370 on the screen. Examples of the picture data include teletext, caption, and a menu screen for the setting items of the display apparatus 300, in addition to video of contents. As the display unit 350, various types of display units such as a liquid crystal display panel, an organic electro luminescence (EL) panel, a PDP, a CRT, a field emission display (FED) panel, and an electrophoresis display panel can be used.

The memory 360 appropriately stores various kinds of data to be processed by the computing unit 370, such as setting items inputted through the operation unit 330, music data, and picture data, in a manner in which the data can be read. The memory 360 also stores various programs to be developed on an operating system (OS) which controls operations of the entire display apparatus 300. It is desired that a memory such as a complementary metal-oxide semiconductor (CMOS) memory in which storage is maintained even when the power supply is suddenly stopped due to a blackout or the like be used as the memory 360. The memory 360 may have a configuration that includes a drive or a driver for storing information in various recording media such as HDs, DVDs, optical discs, and memory cards in a manner in which the information can be read, or a configuration that includes a combination thereof.

In the memory 360, picture quality setting information associated with values of setting factors related to the picture quality of the display unit 350 is stored in advance corresponding to a source of picture data to be displayed on the screen of the display unit 350, details of which are described later. Optimum values of the setting factors for optimally displaying picture data on the display unit 350 are set for each type of sources, for example, types of broadcast waves obtained by the tuner 310 and types of contents obtained through the interface from the outside such as the recording and reproducing apparatus and networks.

The computing unit 370 is provided with, for example, a central processing unit (CPU) and has various input/output ports (not shown). For example, the input/output ports include a receiving port connected to the tuner 310, a data receiving port connected to the interface 320, an input port connected to the operation unit 330, a sound control port connected to the sound producing unit 340, a display control port connected to the display unit 350, and a memory port connected to the memory 360. The computing unit 370 includes, as various programs, a data processing section 371, a data characteristic recognition section 372, a request recognition section 373, a picture quality adjustment section 374, a picture quality adjustment control section 375, and the like.

The data processing section 371 obtains contents outputted from the tuner 310 and the interface 320. The data processing section 371 applies appropriate processing such as decoding processing to the obtained contents to extract audio data and picture data. The extracted audio data is outputted to the sound producing unit 340, and the extracted picture data is outputted to the display unit 350. These output operations are performed in synchronization with each other such that a state of sound output performed by the sound producing unit 340 and a state of screen display performed by the display unit 350 are synchronized. Further, the data processing section 371 obtains picture data of a specific form, such as the menu screen for the setting items, from the memory 360 based on the operation signal outputted from the operation unit 330 in response to an input operation, processes the obtained picture data so that the picture data can be appropriately displayed on the display unit 350, and outputs the processed picture data to the display unit 350.

The data characteristic recognition section 372 recognizes the characteristic of the picture data included in the contents obtained by the data processing section 371, that is, the type of the source. Information on the recognized source is outputted to the picture quality adjustment control section 375.

The request recognition section 373 recognizes picture quality adjustment request information that requests to change values of setting factors related to the picture quality of the display unit 350. The picture quality adjustment request information is recognized based on an operation signal corresponding to a predetermined input operation performed by, for example, a user through the operation unit 330. To be specific, the request recognition section 373 obtains, as the picture quality adjustment request information, an operation signal based on an input operation of directly changing the value of a setting factor using an operation button or the like, an input operation of switching the source, or the like, and then recognizes the request to change the values of the setting factors. The recognized picture quality adjustment request information is outputted to the picture quality adjustment control section.

The picture quality adjustment section 374 controls the display unit 350 and adjusts the picture quality of picture data in displaying on the screen of the display unit 350. The picture quality is adjusted by the processing of appropriately setting the values of a plurality of setting factors related to the picture quality, such as brightness, contrast, black level, hue, and color intensity. Contents of the values of the setting factors to be set by the picture quality adjustment section 374 are controlled by the picture quality adjustment control section 375. The present invention is not limited to a configuration in which all the setting factors such as brightness, contrast, black level, hue, and color intensity are specified. At least two of the setting factors need to be specified.

The picture quality adjustment control section 375 controls the picture quality adjustment section 374 and processing of adjusting picture quality performed by the picture quality adjustment section 374 based on information on the source recognized by the data characteristic recognition section 372 and the picture quality adjustment request information recognized by the request recognition section 373. When it is recognized based on information on the source that the source of picture data to be displayed on the display unit 350 is different from the source of picture data that has been displayed, for example, the picture quality adjustment section 374 is controlled to execute the picture quality adjustment processing based on a source switching request or a direct picture quality adjustment request made through the input operation, which is specified in the picture quality adjustment request information. In a case of a direct picture quality adjustment request, the picture quality adjustment control section 375 controls the picture quality adjustment section 374 to directly change the values of the setting factors according to the input operation. In a case of a source switching request, the picture quality adjustment control section 375 reads picture quality setting information corresponding to the source to be switched, from picture quality setting information stored in the memory 360 in advance, and controls the picture quality adjustment section 374 to change the values of the setting factors according to a predetermined setting content based on the read picture quality setting information.

The control of changing the values according to the predetermined setting content is performed such that, during processing of changing a value of at least one of the plurality of setting factors, processing of changing a value of at least one of the other setting factors is performed. In other words, without changing the value directly to a target value, processing of changing the value of each setting factor is divided into a multiple number of steps, and process steps of changing the value of another setting factor are interposed between these steps, thereby changing the values stepwise. To be specific, as shown in FIG. 2, with respect to three setting factors, i.e., brightness, contrast, and black level related to the picture quality, in a case where the brightness is adjusted in a range of "±5" and the contrast and the black level are each adjusted in a range of "0 to 5" with integers, a control example is described in which the picture quality for a broadcast program (for example, TV broadcast waves) in which the brightness is set to "5", the contrast is set to "0", and the black level is set to "0" is changed to the picture quality for a recording medium (for example, DVD) in which the brightness is set to "−5", the contrast is set to "5", and the black level is set to "5". Since all of the brightness, the contrast, and the black level vary, the values thereof are sequentially changed by 2 each time, which corresponds to two degrees set in advance. When each value is changed by 2 each time to leave 1 to the target value, the remaining 1 is changed. With the sequential changes by 2 each time, changing of the values of the contrast and the black level is completed. However, after the completion, processing of not changing the values is sequentially performed. Note that the number of degrees by which each change is made is not limited to two set in advance, and may be set based on the difference between the predefined value and the target value.

(Operation of the Display System)

Next, picture quality adjustment processing in operations of the display system 100 is described with reference to the drawings. As shown in FIG. 2, in this picture quality adjustment processing, the case of three setting factors, i.e., brightness, contrast, and black level is taken as an example in which the brightness is adjusted in a range of "±5" and the contrast and the black level are each adjusted in a range of "0 to 5" with integers. However, the present invention is not limited to this case. FIG. 3 is a flowchart showing an operation of the picture quality adjustment processing.

First, when the display apparatus 300 of the display system 100 is turned on and the power is supplied thereto, the computing unit 370 reads setting items stored in the memory 360 and recognizes the source of picture data that has been displayed on the screen of the display unit 350 immediately before the power was turned off. Then, the computing unit 370 waits for picture data to be obtained from the source from which the previous picture data was obtained immediately before the power was turned off. To be specific, in a case where a broadcast program has been previously obtained and reproduced, the computing unit 370 waits for a broadcast program of the same channel to be received and processed by the tuner 310, and the contents thereof to be outputted from the tuner 310. Further, in a case where contents outputted from the recording and reproducing apparatus 200 or the network have been previously reproduced, the computing unit 370 waits for contents to be outputted from the recording and reproducing apparatus 200 or the network. When the computing unit 370 waits for contents to be outputted from the recording and reproducing apparatus, the computing unit 370 waits for, for example, picture data of a standby screen that is stored in the memory 360 in advance or picture data of a standby screen that is set in advance from the recording and reproducing apparatus to be obtained.

When the data processing section 371 obtains contents from the previous source, the computing unit 370 appropriately processes the obtained contents to extract audio data and picture data. The extracted audio data is outputted to the sound producing unit 340 and outputted as sound from the sound producing unit 340, and the extracted picture data is outputted to the display unit 350 and displayed on the screen of the display unit 350, thereby appropriately reproducing the contents.

As shown in FIG. 3, after the power is supplied, the computing unit 370 judges, by using the request recognition section 373, whether there is a request to switch the source of contents to be reproduced corresponding to the predetermined input operation through the operation unit 330 (Step S101). In other words, the computing unit 370 waits for a source switching request to be set and inputted, which means that the computing unit 370 is in a standby state for a picture quality adjustment processing request. When the request recognition section 373 obtains picture quality adjustment request information and the picture quality adjustment control section 375 recognizes a source switching request from the picture quality adjustment request information obtained, the picture quality adjustment control section 375 reads picture quality setting information corresponding to a source specified in the switching request from picture quality setting information stored in advance in the memory 360, and obtains the values of the setting factors based on this picture quality setting information (Step S102).

After Step S102, the setting items stored in the memory 360 are read, and the values of the setting factors of the picture quality which have been specified are changed to the values of the setting factors obtained in Step S102. To be specific, the previously-specified value of the setting factor corresponding to contrast is compared with the newly-specified value of the setting factor corresponding to contrast (Step S103). When it is judged in Step S103 that the newly-specified value of the setting factor is larger than the previously-specified value of the setting factor, the picture quality adjustment section 374 is caused to perform processing of incrementing the previously-specified value by "2", which corresponds to two degrees set in advance (Step S104). Thereafter, the value of another setting factor other than contrast is changed. To be specific, the previously-specified value of the setting factor corresponding to black level is compared with the newly-specified value of the setting factor corresponding to black level (Step S105). On the other hand, when it is judged in Step S103 that the values of the setting factor are identical, the flow advances to Step S105.

When it is judged in Step S105 that the newly-specified value of the setting factor corresponding to black level is larger than the previously-specified value thereof, the picture quality adjustment section 374 is caused to perform processing of incrementing the previously-specified value by "2", which corresponds to two degrees set in advance (Step S106). Thereafter, the value of other setting factor other than black level is changed. To be specific, the previously-specified value of the setting factor corresponding to brightness is compared with the newly-specified value of the setting factor corresponding to brightness (Step S107). On the other hand, when it is judged in Step S105 that the values of the setting factor are identical, the flow advances to Step S107.

When it is judged in Step S107 that the newly-specified value of the setting factor corresponding to brightness is smaller than the previously-specified value thereof, the picture quality adjustment section 374 is caused to perform processing of decrementing the previously-specified value by "2", which corresponds to two degrees set in advance (Step S108). Thereafter, it is judged whether adjustment of all the setting factors, that is, changing of all the values has been completed (Step S109). On the other hand, when it is judged in Step S107 that the values of the setting factor are identical, the flow advances to Step S109.

When it is judged in Step S109 that changing of the values of all the setting factors has not been completed, the flow returns to Step S103 to continue the processing of changing the values of the setting factors. On the other hand, when it is judged in Step S109 that changing of the values of all the setting factors has been completed, the control of causing the picture quality adjustment section 374 to perform picture quality adjustment processing is finished.

Here, a case of the above-mentioned stepwise changing is compared with a case of direct changing to a new value. The predefined picture quality is dark with a brightness of "5", a contrast of "0", and a black level of "0". A new picture quality is also dark with a brightness of "−5", a contrast of "5", and a black level of "5". In the configuration of a comparative example in which the values are changed directly to the newly-specified values, when the contrast is changed to "5", the black level is changed to "5", and then the brightness is changed to "−5", the picture quality is in a state where the contrast is "5", the black level is "0", and the brightness is "5" until the black level is changed after having changed the contrast. The picture quality of this state is very bright. Accordingly, in the case of directly changing the values, the user may recognize a flicker in which the screen becomes brighter for a moment, like a noise. On the other hand, in the above embodiment, the values of the setting factors of picture quality are changed stepwise when the optimum picture quality for TV program broadcasting is changed to the optimum picture quality for contents recorded in a recording unit, in response to an input of setting for switching, for example, the source of TV program broadcasting to the source of contents recorded in a recording unit such as an HD or a DVD in the recording and reproducing apparatus 200. Accordingly, it is possible to prevent a sudden change in the picture quality during the processing and a flicker on the screen caused by the picture quality adjustment processing accompanying the source switching.

(Operation Effects of the Display System)

As described above, in the above embodiment, upon recognition of a request to switch to a source of contents to be displayed on the display unit 350, the request requesting to change the values of a plurality of setting factors such as brightness, contrast, and black level related to the picture quality, the picture quality adjustment control section 375 controls the picture quality adjustment section 374 to perform, during processing of changing the value of at least one of the plurality of setting factors, processing of changing the value of at least one of the other setting factors. To be specific, the value of each setting factor is changed in multiple steps, and the values of other setting factors are sequentially changed repeatedly in each step. Accordingly, it is possible to prevent a flicker on the screen caused by a sudden change in the picture quality during the processing of changing the picture quality, thereby favorably changing the settings of the picture quality to favorably adjust the picture quality.

As shown in FIG. 2, in the value changing processing performed in multiple steps, the values of other setting factors are sequentially changed in each step. Accordingly, the picture quality can be smoothly changed through simple processing of sequentially changing the value of each setting factor. With this operation, the configuration can be simplified and the processing can be performed at higher speed with ease. Further, the stepwise value changing processing is sequentially performed in cycles of contrast, black level, and brightness in the stated order. The stepwise value changing processing only needs to be performed in cycles of a predetermined order, so it is possible to further simplify process steps and the configuration and to perform the processing at higher speed. The value changing processing is performed in multiple steps. Accordingly, it is easy to perform processing of sequentially changing the values of different setting factors and to perform smooth picture quality adjustment. Especially when the values of setting factors of brightness, contrast, and black level are changed, the brightness and darkness of the picture quality tends to be clear through the value changing processing. Therefore, the present invention is helpful. Further, when dark picture quality is changed to dark picture quality, the user is likely to recognize setting which makes the screen brighter performed through picture quality changing processing as a flicker. Therefore, the present invention is particularly helpful.

Further, as a request to change the values of setting factors, changing of the type of picture data, that is, the source is recognized. The present invention is particularly helpful in the configuration in which the picture quality is adjusted optimally for each source so that the picture data is favorably viewed, and favorable viewing can be obtained without an inconvenience such as a flicker is caused every time the source is switched.

The computing unit 370 has a configuration for controlling the picture quality adjustment processing as a program so as to be able to execute control of the picture quality adjustment processing. Therefoore, the picture quality adjustment processing is easily performed by incorporating the program or using a recording medium recorded with the program, whereby applications thereof can be easily expanded.

MODIFIED EXAMPLE OF THE EMBODIMENT

The present invention is not limited to the above embodiment and includes the following modification as long as the object of the present invention can be achieved.

That is, the control of the picture quality adjustment processing performed by the display apparatus 300 of the display system 100 has been described. However, as described above, any configurations can be used, such as a configuration in which the entire display system 100 performs control of the picture quality adjustment processing, a configuration in which control is performed to cause the recording and reproducing apparatus 200 to adjust the picture quality of the display apparatus 300, and an apparatus configuration dedicated to control the picture quality adjustment processing. For example, as described above, the present invention is not limited to the system configuration as in the display system 100, and may have an integrated configuration in which the display apparatus 300 includes a recording unit. Further, for example, when a state where the recording and reproducing apparatus 200 outputs contents obtained based on broadcast waves to the display apparatus 300 is switched to a state where contents in the recording unit are outputted, a control signal may be outputted in advance or outputted together with the contents so as to cause the picture quality adjustment section 374 of the display apparatus 300 to adjust the values stepwise. Further, a control signal indicating that a source is to be switched may be outputted, and the picture quality adjustment control section 375 of the display apparatus 300 may recognize the outputted control signal to perform the above-mentioned control. Further, a new value of a setting factor may be outputted as a control signal to the display apparatus 300, and the display apparatus 300 may control stepwise to change the value to the new value.

Contents to be obtained are not limited to TV broadcast programs, as described above, and may include radio broadcast programs, satellite broadcast programs, contents of music and video to be distributed, and various software programs such as game software. In a case where a game machine is connected to the interface 320, the need of the picture quality adjustment processing may be judged by recognizing the source or the type of picture data based on an operation of software of the game machine.

As to the stepwise change of the values of the setting factors, the description has been given to the case where the values of respective setting factors are changed stepwise. However, only one of the setting factors of brightness, contrast, and black level may be changed stepwise, for example. Alternatively, as shown in FIG. 4, processing may be performed such that the value of a setting factor which needs to be changed largely is changed by two degrees each time whereas the values of the other setting factors are changed by one degree each time, for example. With such the configuration, the difference between the values of each setting factor before and after change is recognized, the number of degrees at which the value is changed is set for the value to be changed based on that difference, and the picture quality adjustment section 374 is caused to change and set the value by the set number of degrees. Further, for example, the number of degrees by which each stepwise change is performed may be appropriately changed such that a value is changed by one degree each time at first and then changed by two degrees each time in the middle of the changing processing. With such the operation in which the number of degrees by which each stepwise change is performed is changed, picture quality can be changed more continuously.

The description has been given to the case where there are three setting factors, i.e., brightness, contrast, and black level, and the values corresponding to those setting factors are changed in cycles of contrast, black level, and brightness. However, when other setting factors such as color intensity and hue are included, the two setting factors may be interposed or contained in the cycle, for example, the values corresponding to all setting factors that include color intensity and hue may be sequentially changed stepwise in cycles of contrast, black level, brightness, color intensity, and hue in the stated order. Further, the order of the setting factors in the cycle is not limited to the above-mentioned order. The order may be appropriately set, and may also be changed for each processing. For example, in the above-mentioned case of three setting factors, when the values are changed by two degrees, processings of changing the values of the setting factors corresponding to contrast and black level are completed before processing of changing the value of the setting factor corresponding to brightness is completed. Thus, the value changing processing may be performed in cycles of brightness, contrast, brightness, and black level in the stated order, for example. Further, if the processing of changing the value of any setting factor has not been completed yet, the values of other setting factors may not be changed sequentially in a cycle and may be changed in parallel with the processing.

The description has been given to the case where switching of the source of contents is recognized as a picture quality adjustment request. In addition to the switching of the source, changing of the type of picture data may be recognized to control the picture quality adjustment processing, as described above. For example, recognition of the changing of the type of picture data may be applied to the case of switching analog terrestrial broadcasting to digital terrestrial broadcasting or to digital satellite broadcasting. Further, changing of contents, for example, switching a news program to a night-game sports program, may be recognized to control the picture quality adjustment processing. In this case, the contents may be recognized based on information on the contents, such as EPG data that is an electronic program guide.

The description has been given to the case of providing the picture quality setting information in which the value of each setting factor is set in advance for each source. However, as described above, the value of a setting factor may be calculated. For example, processing may be performed such that when the characteristic of picture data is changed, for example, when picture data having many scenes which are generally bright is switched to picture data having many scenes which are generally dark, the value of a setting factor to be changed may be calculated from the previous value of the setting factor based on the difference of the characteristic from the previous picture data, and the calculated value of the setting factor may be changed as the above-mentioned new value.

Each of the above-mentioned functions is implemented by a program. However, as described above, each function may be implemented by a configuration of hardware such as a circuit board or of an element such as a single IC, and either configuration may be used. By setting the configuration as the program or one to be read from a recording medium additionally provided, handling is made easy, and a computing unit of a computer and the like can be easily functioned as an information processor (CPU), the recording and reproducing apparatus 200, or the like, thereby achieving expansion of applications with ease.

In addition, specific configuration and procedure for carrying out the present invention can be appropriately changed to another configuration as long as the object of the present invention can be achieved.

EFFECTS OF THE EMBODIMENT

As described above, in this embodiment, upon recognition of changing of the values of a plurality of setting factors such as brightness, contrast, and black level related to the picture quality, the picture quality adjustment section 374 is controlled to perform, during processing of changing the value of at least one of the plurality of setting factors, processing of changing the value of at least one of the other setting factors. Thereforee, it is possible to prevent a flicker on the screen caused by a sudden change in the picture quality during the processing of changing the picture quality, thereby favorably changing the settings of the picture quality.

Further, in the above embodiment, upon recognition of changing of the characteristic such as the type and the source of picture data to be displayed on the screen of the display unit, the picture quality adjustment section 374 is controlled to perform, during processing of changing the value of at least one of the plurality of setting factors, processing of changing the value of at least one of the other setting factors. Thereforee, it is possible to prevent a flicker on the screen caused by a sudden change in the picture quality during the processing of changing the picture quality, thereby favorably changing the settings of the picture quality.

The invention claimed is:

1. A picture quality control apparatus for controlling processing in which a picture quality adjustment section changes values of a plurality of setting factors related to picture quality in a display unit for displaying picture data on a screen to adjust the picture quality, the picture quality control apparatus comprising:
   a request recognition section for recognizing picture quality adjustment request information which requests the picture quality adjustment section to change the values of the plurality of setting factors; and
   a picture quality adjustment control section for controlling the picture quality adjustment section to execute, during processing of changing a value of at least one of the plurality of setting factors, processing of changing a value of at least another one of the plurality of setting factors, based on a recognition of the picture quality adjustment request information,
   wherein the request recognition section recognizes a signal indicating that a type of the picture data to be displayed on the screen of the display unit is to be changed, as the picture quality adjustment request information which requests to change the values of the plurality of setting factors, and
   wherein, when changing of the type of the picture data is recognized, the picture quality adjustment control section controls the picture quality adjustment section to execute processing of changing to values of the plurality of setting factors which correspond to the type of the picture data to be displayed and which have been set in advance for each type of the picture data.

2. A picture quality control apparatus for controlling processing in which a picture quality adjustment section changes values of a plurality of setting factors related to picture quality in a display unit for displaying picture data on a screen to adjust the picture quality, the picture quality control apparatus comprising:
   a data characteristic recognition section for recognizing characteristic of the picture data to be displayed on the screen of the display unit; and
   a picture quality adjustment control section for controlling the picture quality adjustment section to execute, during processing of changing a value of at least one of the plurality of setting factors, processing of changing a value of at least another one of the plurality of setting factors when changing of the characteristic of the picture data recognized by the data characteristic recognition section is recognized,
   wherein:
   the data characteristic recognition section recognizes a type of the picture data as the characteristic; and
   the picture quality adjustment control section controls processing of changing the values of the plurality of setting factors executed by the picture quality adjustment section when changing of the type of the picture data is recognized,
   wherein, when changing of the type of the picture data is recognized, the picture quality adjustment control section controls the picture quality adjustment section to execute processing of changing to values of the plurality of setting factors which correspond to the type of the picture data to be displayed and which have been set in advance for each type of the picture data.

3. A picture quality control apparatus for controlling processing in which a picture quality adjustment section changes values of a plurality of setting factors related to picture quality in a display unit for displaying picture data on a screen to adjust the picture quality, the picture quality control apparatus comprising:
   a request recognition section for recognizing picture quality adjustment request information which requests the picture quality adjustment section to change the values of the plurality of setting factors; and
   a picture quality adjustment control section for controlling the picture quality adjustment section to execute, during processing of changing a value of at least one of the plurality of setting factors, processing of changing a value of at least another one of the plurality of setting factors, based on a recognition of the picture quality adjustment request information,
   wherein the request recognition section recognizes a signal indicating that a type of the picture data to be displayed on the screen of the display unit is to be changed, as the picture quality adjustment request information which requests to change the values of the plurality of setting factors, and
   wherein, in a case where changing of the type of the picture data is recognized, when the picture quality adjustment control section recognizes a difference between picture quality states before and after the change of the type, and the difference between the picture quality states is larger than a predetermined threshold, the picture quality adjustment control section controls the picture quality adjustment section to execute processing of changing to values of the plurality of setting factors at which the difference between the picture quality states becomes smaller.

4. A picture quality control apparatus for controlling processing in which a picture quality adjustment section changes values of a plurality of setting factors related to picture quality in a display unit for displaying picture data on a screen to adjust the picture quality, the picture quality control apparatus comprising:
- a data characteristic recognition section for recognizing characteristic of the picture data to be displayed on the screen of the display unit; and
- a picture quality adjustment control section for controlling the picture quality adjustment section to execute, during processing of changing a value of at least one of the plurality of setting factors, processing of changing a value of at least another one of the plurality of setting factors when changing of the characteristic of the picture data recognized by the data characteristic recognition section is recognized, wherein:
the data characteristic recognition section recognizes a type of the picture data as the characteristic; and
the picture quality adjustment control section controls processing of changing the values of the plurality of setting factors executed by the picture quality adjustment section when changing of the type of the picture data is recognized,
wherein, in a case where changing of the type of the picture data is recognized, when the picture quality adjustment control section recognizes a difference between picture quality states before and after the change of the type, and the difference between the picture quality states is larger than a predetermined threshold, the picture quality adjustment control section controls the picture quality adjustment section to execute processing of changing to values of the plurality of setting factors at which the difference between the picture quality states becomes smaller.

5. A picture quality control apparatus for controlling processing in which a picture quality adjustment section changes values of a plurality of setting factors related to picture quality in a display unit for displaying picture data on a screen to adjust the picture quality, the picture quality control apparatus comprising:
- a request recognition section for recognizing picture quality adjustment request information which requests the picture quality adjustment section to change the values of the plurality of setting factors; and
- a picture quality adjustment control section for controlling the picture quality adjustment section to execute, during processing of changing a value of at least one of the plurality of setting factors, processing of changing a value of at least another one of the plurality of setting factors, based on a recognition of the picture quality adjustment request information,
wherein the request recognition section recognizes a signal indicating that a type of the picture data to be displayed on the screen of the display unit is to be changed, as the picture quality adjustment request information which requests to change the values of the plurality of setting factors, and
wherein the picture quality adjustment control section divides the processing of changing the values of the plurality of setting factors executed by the picture quality adjustment section into multiple steps, and controls such that a step of changing values of the other setting factors of the plurality of setting factors is executed between the multiple steps.

6. A picture quality control apparatus according to claim 5, wherein the picture quality adjustment control section causes a part of the multiple steps to be executed as the processing of changing the values of the other setting factors of the plurality of setting factors executed during the processing of changing the value of any one of the plurality of setting factors.

7. A picture quality control apparatus for controlling processing in which a picture quality adjustment section changes values of a plurality of setting factors related to picture quality in a display unit for displaying picture data on a screen to adjust the picture quality, the picture quality control apparatus comprising:
- a data characteristic recognition section for recognizing characteristic of the picture data to be displayed on the screen of the display unit; and
- a picture quality adjustment control section for controlling the picture quality adjustment section to execute, during processing of changing a value of at least one of the plurality of setting factors, processing of changing a value of at least another one of the plurality of setting factors when changing of the characteristic of the picture data recognized by the data characteristic recognition section is recognized,
wherein the picture quality adjustment control section divides the processing of changing the values of the plurality of setting factors executed by the picture quality adjustment section into multiple steps, and controls such that a step of changing values of the other setting factors of the plurality of setting factor is executed between the multiple steps.

8. A picture quality control apparatus according to claim 7, wherein the picture quality adjustment control section causes a part of the multiple steps to be executed as the processing of changing the values of the other setting factors of the plurality of setting factors executed during the processing of changing the value of any one of the plurality of setting factors.

9. A picture quality control apparatus for controlling processing in which a picture quality adjustment section changes values of a plurality of setting factors related to picture quality in a display unit for displaying picture data on a screen to adjust the picture quality, the picture quality control apparatus comprising:
- a request recognition section for recognizing picture quality adjustment request information which requests the picture quality adjustment section to change the values of the plurality of setting factors; and
- a picture quality adjustment control section for controlling the picture quality adjustment section to execute, during processing of changing a value of at least one of the plurality of setting factors, processing of changing a value of at least another one of the plurality of setting factors, based on a recognition of the picture quality adjustment request information,
wherein the picture quality adjustment control section controls the picture quality adjustment section to execute the processing of changing the values of the other setting factors of the plurality of setting factors to change the values stepwise before the processing of changing the values of the plurality of setting factors is completed.

10. A picture quality control apparatus according to claim 9, wherein the picture quality adjustment control section controls the processing of changing the values of the other setting factors of the plurality of setting factors to change the values stepwise.

11. A picture quality control apparatus for controlling processing in which a picture quality adjustment section changes values of a plurality of setting factors related to picture quality in a display unit for displaying picture data on a screen to adjust the picture quality, the picture quality control apparatus comprising:

a data characteristic recognition section for recognizing characteristic of the picture data to be displayed on the screen of the display unit; and a picture quality adjustment control section for controlling the picture quality adjustment section to execute, during processing of changing a value of at least one of the plurality of setting factors, processing of changing a value of at least another one of the plurality of setting factors when changing of the characteristic of the picture data recognized by the data characteristic recognition section is recognized, wherein the picture quality adjustment control section controls the picture quality adjustment section to execute the processing of changing the values of the other setting factors of the plurality of setting factors to change the values stepwise before the processing of changing the values of the plurality of setting factors is completed.

12. A picture quality control apparatus according to claim 11, wherein the picture quality adjustment control section controls the processing of changing the values of the other setting factors of the plurality of setting factors to change the values stepwise.

* * * * *